United States Patent
Isherwood

(10) Patent No.: US 6,342,168 B1
(45) Date of Patent: Jan. 29, 2002

(54) COMPOSITION AND METHOD FOR REDUCING NOISE AND/OR FOULING IN A LIQUID COOLING SYSTEM

(76) Inventor: Adam Isherwood, 61 Bromsgrove Road, Redditch, Worcester B97 4RH (GB)

( * ) Notice: Subject to any disclaimer, the term of this patent is extended or adjusted under 35 U.S.C. 154(b) by 0 days.

(21) Appl. No.: 09/403,395

(22) PCT Filed: Apr. 24, 1998

(86) PCT No.: PCT/GB98/01218

§ 371 Date: Oct. 20, 1999

§ 102(e) Date: Oct. 20, 1999

(87) PCT Pub. No.: WO98/49250

PCT Pub. Date: Nov. 5, 1998

(30) Foreign Application Priority Data

Apr. 25, 1997 (GB) .............................................. 9708575

(51) Int. Cl.[7] ................................................. C09K 5/00

(52) U.S. Cl. .............................. 252/73; 252/71; 252/72; 252/8.05; 252/363.3

(58) Field of Search ........................... 252/72, 73, 8.05, 252/71, 363.5

(56) References Cited

U.S. PATENT DOCUMENTS 4,524,158 A * 6/1985 Barber ........................ 523/130

* cited by examiner

*Primary Examiner*—Mark Kopec
*Assistant Examiner*—Derrick Hamlin
(74) *Attorney, Agent, or Firm*—Klauber & Jackson

(57) ABSTRACT

A composition for use in reducing noise in a liquid-cooling system of an engine, eg an automotive engine, comprising an organo-polymeric microfibril material insoluble in the cooling liquid of the liquid-cooling system. Preferably the microfibril material is contained in a carrier, which maybe in the form of a liquid, a gel or a compressed tablet soluble or dispersible in the cooling liquid.

23 Claims, No Drawings

COMPOSITION AND METHOD FOR REDUCING NOISE AND/OR FOULING IN A LIQUID COOLING SYSTEM

DESCRIPTION OF INVENTION

This invention relates to a composition for use in reducing noise and/or fouling in a liquid cooling system of an engine, and a method of reducing noise and/or fouling in such a liquid cooling system.

It is known that noise is produced as a result of vortexing cavitation, and eddying when liquid flows in pipes, ducts, and hollow castings.

The methods currently used to reduce noise produced by liquid flowing in closed systems specifically the cooling system of a heat engine, has to date been concentrated on macro-mechanical aspects, i.e. by varying the pump specification or surrounding the sound source in sound absorbing materials, or increasing the thickness of the liquid container. Other methods have been to reduce the cooling system volume to a minimum or to polish the internal surfaces of the coolant conducting pipes whose normal bend, constrictions, expansions, and roughness promote the vortexing cavitation, and eddying that produces vibrations and noise.

All these methods have limited application, and fail to resolve the primary causes of the noise, i.e. cavitation. vortexing, and eddying produced as the liquid circulates.

An object of the present invention is to provide a composition and a method of reducing (the primary causes of noise at a "micro-mechanical" level resulting in reduced cavitation, vortexing, and eddying, and therefore noise.

A first aspect of the invention provides a composition for use in reducing noise fouling in a liquid cooling system of an engine comprising an organo-polymeric microfibril material insoluble in the cooling liquid of the liquid cooling system, the microfibrils having an aspect ratio (length to diameter) in the range 10 to 5000.

A second aspect of the invention provides a method of reducing noise and/or fouling, in a liquid cooling system of an engine comprising adding the composition according, to the first aspect of the invention to a liquid cooling system of an engine.

The microfibril material when introduced into the liquid cooling system reduces cavitation, vortexing, eddying, and therefore noise. In addition it reduces the fouling, if any, of the internal surfaces of the cooling system.

Preferably the aspect ratio is in the range 10 to 3000. Excessive aspect ratio would lead to entanglement of individual microfibrils, and hence precipitation in the flowing, liquid.

Preferably, the organo-polymeric microfibril material is a solid organic polymer in the form of microfibrils having an average diameter in the range of 1 nm–15 µm, an average length in the range of 100 nm–3 mm. Polymeric materials to be processed into microfibrils should be insoluble but highly dispersible in a given coding liquid. There may be used for example polyethylene, polyproplyene, polystyrene, polyvinyl chloride, polyvinylidene chloride, polytetrafluoroethylene, polyethylene terephthalate, polymethylmethacrylate nylon, polycarbonate, and copolymers or blends thereof.

Polymeric compounds known for their heat resistance may be used which include para-amides, aromatic polyamides, aromatic polyethers, polyetheretherketones, aromatic polyesters, aromatic polyimides, and polybenzoimidazoles.

Polymeric materials that have been found particularly preferable are those which are capable Of forming a liquid crystal. Specific examples include aramide fibres such as poly-p-phenylene terephthalamide wet spun from sulfuric acid liquid crystal solutions, and polybenzobisthiazole wet spun from polyphosphoric acid liquid crystal solution.

By "microfibril" is meant short lengths of fibre. The microfibrils are not microfibrillated.

By "highly dispersible" is meant the state of the polymeric microfibrils which can be seen to form a uniform suspension after being vigorously mixed for a period of time.

The choice of polymeric microfibril material will depend upon the particular kind of cooling liquid in which the material is used; clearly, the material should not react chemically with the cooling liquid of the liquid cooling system, nor with the carrier liquid. Furthermore, the polymeric microfibril material should not be readily degradable, but should have a reasonable life in the cooling liquid.

What is meant by the microfibrils being "insoluble" in a liquid may be determined by an experiment in which 1 weight percent of polymeric microfibrils is added to the liquid, and stirred vigorously for five hours at a working temperature, followed by filtration, and drying whereupon the material is measured for weight reduction. If this reduction is less than 10 weight parent of the original weight then the microfibril material is regarded as insoluble.

There is no restriction placed on how to make the polymeric microfibril material.

In order to improve the dispersibility of the microfibril material in the cooling liquid, and to enhance the stability of the resulting suspension, the material may be treated with a suitable surfactant, or chemically modified, or physically treated.

A suitable surfactant is modified alcohol "Ethylan CPG660" or "Monolan 8000/E80" of Ackros Chemicals Limited.

The cooling liquid of the liquid cooling system may be aqueous or non-aqueous, e.g. hydrofluroether, water, oils, a liquid hydrocarbon or any other suitable liquid coolant.

In order to reduce the risk of dust health hazard, the said material is preferably contained in a carrier, The carrier may be, e.g. a liquid, a gel or a compressed tablet soluble a dispersible in the said cooling liquid.

The carrier is preferably completely soluble in the cooling liquid. When the carrier is a liquid or a gel it should prevent settling of the polymeric microfibril material during storage, and promote accurate dosing during packaging, or in production line application requiring portioning of bulk quantities. Such a carrier could be magnesium aluminium silicate in suspension, propylene glycol, cellulose solution or any other suitable compound.

The method of the invention finds effective application where liquids are used in closed cooling systems particularly where noise pollution or fouling are negative factors of the system, as with automotive cooling, systems, and more generally where any heat engine with a liquid cooled system is employed.

The invention will now be described with reference to the following examples:

EXAMPLE 1

A suitable suspension was prepared by blending a water glycol mixture (approximately 33% by weight of glycol), and a surfactant (modified alcohol ethoxylate at 6 ppm with polymeric microfibrils of Nylon-6 of size 10 nm by 1 μm, i.e. an aspect ratio of 100, at 50 ppm. The solution was subjected to 10,000 cycles in an automotive cooling system As compared with the use of a water glycol mixture on its own, the addition of the polymeric microfibril material produced a substantial noise reduction. However, the noise reduction decreased proportionally with increasing cycle number throughout the test; sonic degradation of the suspension was observed.

In addition, as compared with a water glycol mixture on its own, the addition of the polymeric microfibril material produced a measurable reduction in surface fouling within the cooling system.

EXAMPLE 2

A stable suspension was prepared by blending a water glycol mixture and a surfactant at 6 ppm as in Example 1 with polymeric microfibrils of aramide, i.e. poly-p-phenylene terephthalamide (e.g. Du Pont's KEVLAR®) of size 12 μm by 250 μm, i.e., an aspect ratio of 20.9, at 100 ppm. The solution was subjected to 10,000 cycles in a closed system.

As compared with the use of a water glycol mixture on its own, the polymeric microfibril material produced a consistent reduction in noise throughout the test and no degradation of the suspension was observed. The noise reduction observed was greater than for Example 1.

In addition, as compared with a water glycol mixture oil its own, the addition of the polymeric microfibril material produced a measurable reduction in surface fouling within the cooling system.

EXAMPLE 3

A stable suspension was prepared by blending a water glycol mixture, and a surfactant at 6 ppm as in Example 1 with polymeric microfibrils of poly-p-phenylene terephthalamide of size 5 μm by 250 μm, i.e. an aspect ratio of 50, at 400 ppm. The solution was subjected to 10,000 cycles in a closed system.

As compared with the use of a water glycol mixture on its own, the polymeric microfibril material produced a consistent reduction in noise throughout the test, and no degradation of the suspension was observed. The noise reduction observed was greater than for Example 2.

EXAMPLE 4

A stable suspension was prepared. by blending a water glycol mixture and a surfactant at 6 ppm as in Example 1 with polymeric microfibrils of poly-p-phenylene terephthalamide of size 50 nm by 250 μm, i.e. an aspect ratio of 5000, at 100 ppm. The solution was subjected to 10,000 cycles in a closed system.

As compared with the use of a water glycol mixture on its own, the polymeric microfibril material produced a consistent reduction in noise throughout the test and no degradation of the suspension was observed. The noise reduction observed was even greater than for Example 3.

The noise reduction observed was typically in the range 8 to 15 dB at frequencies in the range 3 to 10 KHz.

The anti-fouling observed, which is difficult to quantify, was that of the internal surfaces of the cooling system becoming generally cleaner and on most occasions in removal or apparent calcifications.

The anti-fouling observed which is difficult to quantify, was that of the internal surfaces of the cooling system becoming generally cleaner and on most occasions the removal of apparent calcifications.

In order to reduce the noise and fouling, if any, in a vehicle engine liquid cooling system, the composition is added to the expansion tank of the vehicle radiator, or directly into the radiator. If the carrier is a liquid the composition may be contained in a bottle. The bottle would be shaken before the contents are added in the cooling system. Noise reduction is achieved once the composition has been completely dispersed in the cooling system, and this occurs rapidly once the engine is running. The anti-fouling effect is observed over a period of time during which the engine has been running. The composition may be removed by draining and flushing the cooling system.

It should be understood that the term microfibril is intended to mean only short lengths or fibres. The microfibrils are nor microfibrillated as this would degrade the performance of the composition as the microfibrils would tend to become entangled and thus flock or clump together and sediment out rather than remain in suspension. It is also preferred that the microfibrils should be formed of flexible rather than brittle material, as in the latter case the microfibrils breakdown over time and the performance of the composition is again degraded.

The features disclosed in the foregoing description the following claims or the accompanying drawings expressed in their specific forms or in terms of a means for performing the disclosed function, or a method or process for attaining the disclosed result, or a (lass or group of substances or compositions, as appropriate, may, separately, or in any combination of such features, be utilised for realising the invention in diverse forms thereof.

What is claimed is:

1. A composition for use in reducing noise and/or fouling in a liquid cooling system of an engine comprising an organo-polymeric microfibril material insoluble in the cooling liquid of the liquid cooling system, the microfibrils having, an aspect ratio (length to diameter) in the range 10 to 5000.

2. A composition according to claim 1 wherein the aspect ratio of the microfibrils is in the range 10 to 3000.

3. A composition as claimed in claim 1 or 2, wherein the said material is contained in a carrier.

4. A composition as claimed in claim 3, wherein the carrier is a liquid, the said material being insoluble and dispersible in the carrier liquid.

5. A composition as claimed in claim 3, wherein he carrier is a gel soluble in the said cooling liquid, the said material being insoluble and dispersible in the gel.

6. A composition as claimed in claim 3, wherein the carrier is in the form of a compressed tablet soluble or dispersible in the said cooling liquid.

7. A composition as claimed in claim 4, wherein the carrier liquid is a glycol, a magnesium aluminium silicate in suspension an alcohol, or a hydroxybenzoate.

8. A composition as claimed in claim 1, wherein the said material has an average diameter from 1 nm–15 μm, an average length from 100 nm–3 mm.

9. A composition as claimed in claim 1, wherein the said material is selected from para-amides, aromatic polyamides, aromatic polyethers, polyetheretherketones, aromatic polyesters, aromatic polyimides, polybenzoimidazoles, polyethylene, polypropylene, polystyrene, polyvinyl chloride, polyvinylidene chloride, polytetrafluoroethylene, polyethylene terephthalate, polymethylmethacrylate, nylon, polycarbonate, and copolymers or mixtures thereof.

10. A composition as claimed in claim 9, wherein, the said material is capable of forming a liquid crystal.

11. A composition as claimed in claim 10, wherein the compound is poly-p-phenylene terephthalamide or polybenzobisthiazole.

12. A composition as claimed in claim 1, wherein the carrier includes a surfactant to facilitate stability of the said material in the cooling liquid of the liquid cooling system.

13. A method of reducing noise and/or fouling in a liquid cooling system of an engine by adding to the cooling liquid a composition as claimed in claim 1.

14. A method as claimed in claim 13, wherein the amount of composition added is 0.1 ppm to 5 percent by weight of the cooling liquid.

15. A method as claimed in claim 13 or 15, wherein the composition is added to the cooling liquid of in automotive cooling system.

16. A composition as claimed in claim 3, wherein the said material has an average diameter from 1 nm–15 $\mu$, an average length from 100 nm–3 mm.

17. A composition as claimed in claim 4, wherein the said material has an average diameter from 1 nm–15 $\mu$, an average length from 100 nm–3 mm.

18. A composition as claimed in claim 3, wherein the said material is selected from para-amides, aromatic polyamides, aromatic polyethers, polyetheretherketones, aromatic polyesters, aromatic polyimides, polybenzoimidazoles, polyethylene, polypropylene, polystyrene, polyvinyl chloride, polyvinylidene chloride, polytetrafluoroethylene, polyethylene terephthalate, polymethylmethacrylate, nylon, polycarbonate, and copolymers and mixtures thereof.

19. A Composition as claimed in claim 4, wherein the said material is selected from para-amides, aromatic polyamides, aromatic polyethers, polyetheretherketones, aromatic polyesters, aromatic polyimides, polybenzoimidazoles, polyethylene, polypropylene, polystyrene, polyvinyl chloride, polyvinylidene chloride, polytetrafluoroethylene, polyethylene terephthalate, polymethylmethacrylate, nylon, polycarbonate, and copolymers and mixtures thereof.

20. A composition as claimed in claim 3, wherein the carrier includes a surfactant to facilitate stability of the said material in the cooling liquid of the liquid cooling system.

21. A composition as claimed in claim 4, wherein the carrier includes a surfactant to facilitate stability of the said material in the cooling liquid of the liquid cooling system.

22. A method of reducing noise and/or fouling in a liquid cooling system of an engine by adding to the cooling liquid a composition as claimed in claim 3.

23. A method of reducing noise and/or fouling in a liquid cooling system of an engine by adding to the cooling liquid a composition as claimed in claim 4.

* * * * *